United States Patent [19]

Schneider

[11] Patent Number: 5,160,298
[45] Date of Patent: Nov. 3, 1992

[54] TELESCOPIC TRIPLAN UNIVERSAL JOINT BEARING RETAINING SPRING

[75] Inventor: Dean J. Schneider, Highland, Mich.

[73] Assignee: GKN Automotive, Inc., Auburn Hills, Mich.

[21] Appl. No.: 693,433

[22] Filed: Apr. 29, 1991

[51] Int. Cl.⁵ .............................................. F16D 3/26
[52] U.S. Cl. .................................... 464/111; 464/167; 464/905
[58] Field of Search ............... 464/111, 905, 167, 132, 464/120, 122, 128

[56] References Cited

U.S. PATENT DOCUMENTS

| | | | |
|---|---|---|---|
| 3,381,497 | 5/1968 | Allen | 464/122 |
| 4,346,570 | 8/1982 | Nakamura et al. | 464/120 |
| 4,490,126 | 12/1984 | Orain | 464/111 |
| 4,580,995 | 4/1986 | Orain | 464/120 X |
| 4,592,735 | 6/1986 | Orain | 464/111 |
| 4,619,628 | 10/1986 | Orain | 464/111 |
| 4,684,356 | 8/1987 | Kimata et al. | 464/111 |
| 4,708,693 | 11/1987 | Orain | 464/111 |
| 4,828,534 | 5/1989 | Orain | 464/111 |

*Primary Examiner*—Daniel P. Stodola
*Assistant Examiner*—Tony A. Gayoso
*Attorney, Agent, or Firm*—Harness, Dickey & Pierce

[57] ABSTRACT

A positioning spring for a triplan universal joint has a body with a first and second end. Arms to retain bearings extend from each end of the body. A resilient finger, between the arms on the body, secures the spring to a trunnion and positions the bearing with respect to the trunnion.

9 Claims, 2 Drawing Sheets

TELESCOPIC TRIPLAN UNIVERSAL JOINT BEARING RETAINING SPRING

BACKGROUND OF THE INVENTION

The invention relates to universal joints and, more particularly, to a telescopic triplan universal joint bearing retaining spring.

Telescopic triplan joints have been available to the transportation industry for numerous years. Telescopic triplan universal joints provide the necessary angular and elongation movement required by the joint while at the same time, isolating the sprung mass from externally produced vibrations and vibrations generated by the joint itself.

Prior joint designs called tripods transmit loads through the joint during elongation changes due to the sliding action of the joints internal components. As the conventional tripod joint angle increases, the magnitude of the force caused by this sliding action also increases.

Telescopic triplan joints separate the components which are responsible for the angulation and elongation of the joint. This separation of functions enables the joints to utilize rolling friction instead of sliding friction during elongation movement while the joint is at an angle. Thus, these components significantly reduce the loads transmitted and generated by the joint. Unfortunately, the length of rolling travel available to these telescopic triplan joints is limited by the design of the internal components.

In actual vehicle use, the travel requirement of the vehicle universal joint is beyond the rolling travel capabilities of these joints. The triplan joints have a specific amount of rolling plunge which is sufficient to accommodate the smaller amounts of elongation required by engine vibrations or small suspension movements. However, when these triplan joints reach the end of their rolling travel, any additional travel is taken up by a sliding action. Thus, the triplan joint, during sliding elongation, has the same problems associated with conventional tripod joints.

In an attempt to overcome the problems with sliding elongation, earlier designs of triplan joints provided a positioning mechanism for the internal joint components to insure the proper amount of rolling plunge would be available to the triplan joint. Such devices are illustrated by the following patents.

U.S. Pat. No. 4,490,126 issued to Michael A. Orain on Dec. 25, 1984 illustrates a telescopic triplan universal joint. This patent illustrates a return device which helps to position the needle cages at a predetermined position within their travel. While the return device appears to function satisfactorily, it is complicated, expensive and required additional travel to be incorporated into the joint to accommodate the design.

U.S. Pat. No. 4,592,735 issued to Michael A. Orain on Jun. 3, 1986 also recognizes the need for a positioning device. The patent illustrates a non-positive device which utilized different sized needles relative to their location in the needle cage. While the device appears to function satisfactorily, it requires torque to be applied to the joint.

U.S. Pat. No. 4,619,628 issued to Michael A. Orain on Oct. 28, 1986 also recognizes the need for a positioning device. The patent illustrates a spring between the slide and the needle cage. While the device appears to function satisfactorily, attachment of the spring to the needle cage requires both a complicated and expensive needle cage assembly, and the assembly of the joint itself is not fully simplified by using the subassembly feature of this design.

Accordingly, it is desirous to have a needle cage positioning means which is relatively inexpensive, reliable, and further simplifies the assembly of the joint.

SUMMARY OF THE INVENTION

The present invention discloses an improved telescopic triplan universal joint. The present invention discloses an improved positioning spring mechanism for the telescopic triplan universal joint. The spring mechanism continuously positions the cage with respect to the button to insure sufficient rolling plunge travel. In addition to the positioning feature, the positioning spring also serves as an assembling aid. The internal joint components (e.g. the inner joint member, buttons, cages, roller bearings, and positioning springs) are assembled into a subassembly which can then be easily inserted into the outer joint member.

From the following detailed description of the present invention taken in conjunction with the accompanying drawings and claims, other objects and advantages of the present invention will become apparent to those skilled in the art.

DETAILED DESCRIPTION OF THE PREFERRED EMBODIMENT

Figure 1:
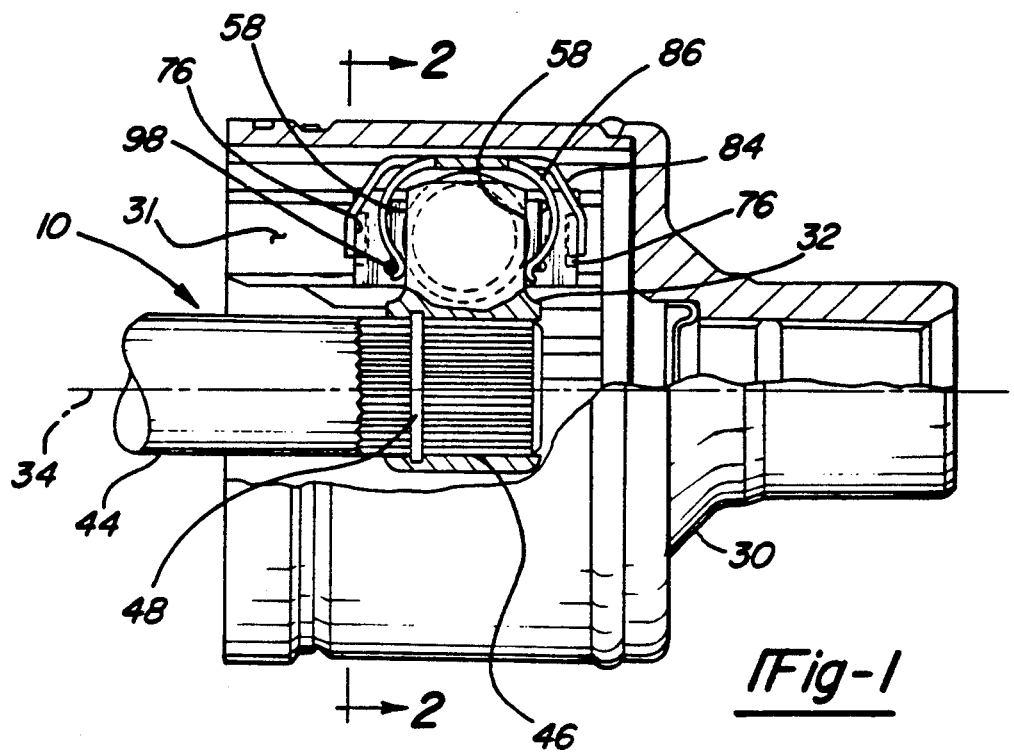
FIG. 1 is a side elevation view partially in cross section of the telescopic triplan assembly in accordance with the present invention.
Figure 2:
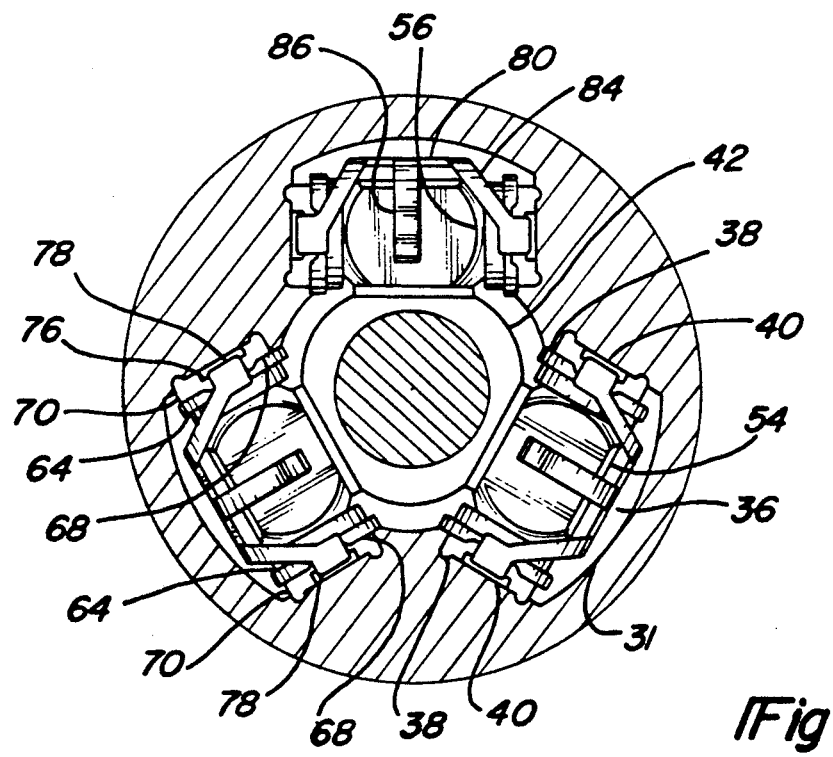
FIG. 2 is a sectional view of FIG. 1 along the line 2—2 thereof.
Figure 3:
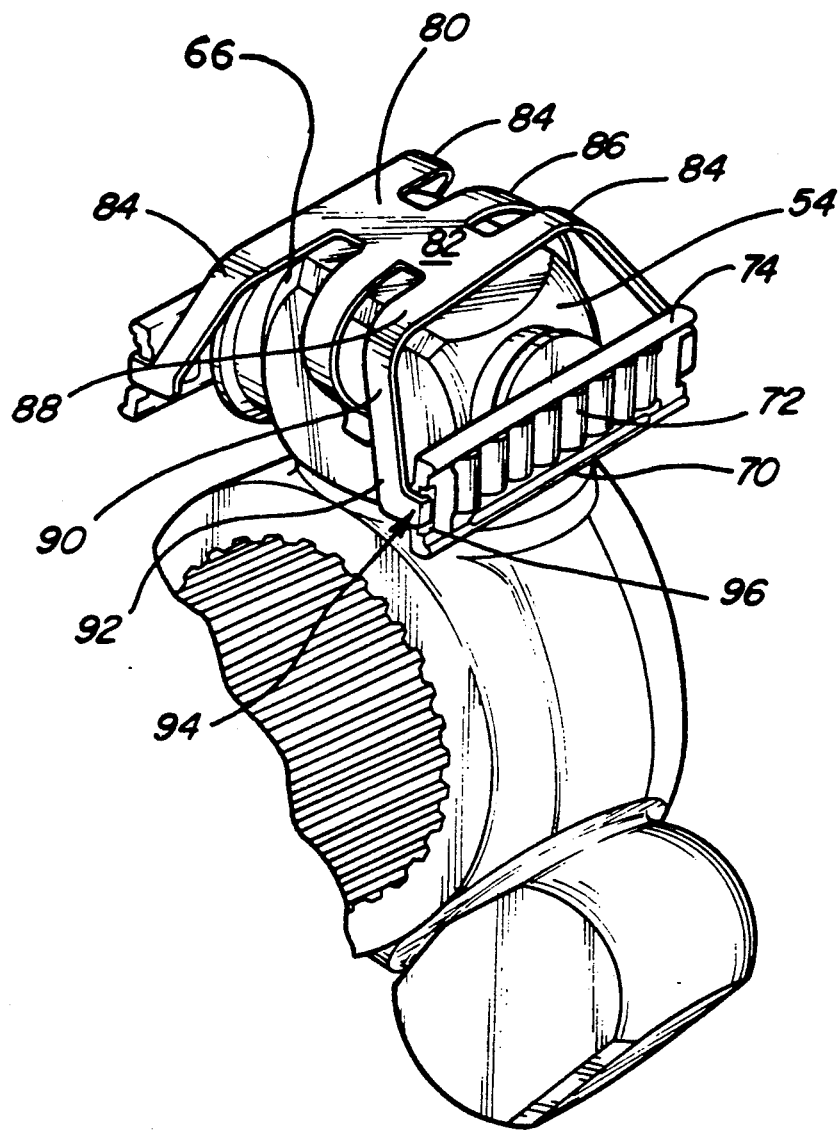
FIG. 3 is a perspective view of an inner joint member subassembly in accordance with the present invention.

A telescopic universal joint in accordance with the present invention is shown in FIGS. 1-3 and is designated by reference number 10. The telescopic triplan universal joint 10 has an outer joint member 30 and an inner joint member assembly 32.

The outer joint member is a bell shaped housing and is rotatable about an axis 34. The bell shaped housing has three longitudinal chambers 36 formed in its interior wall 31. The chambers 36 are generally parallel to the axis 34. Each of the longitudinal chambers 36 are defined by opposing longitudinal sidewalls 38 which are generally parallel to the axis 34. Each of the longitudinal sidewalls 38 includes a longitudinal guideway portion 40.

The inner joint assembly 32 includes spider member 42 and shaft 44, buttons 64, needle cage assemblies 70 and spring 80. The spider 42 may be integral or separate with the shaft. When the spider 42 is separate from the shaft, it is secured by spline means 46 and snap ring 48. The spider 42 has three equally circumferentially spaced and radially extending trunnions 54. Each trunnion is adapted to extend into one of the chambers 36 as seen in FIG. 2. The trunnions 54 have a pair of partial spherical surfaces 56 and a pair of substantially flat surfaces 58.

A button 64 and needle cage assembly 70 are disposed between each of the trunnion spherical surfaces 56 and their respective longitudinal guideway portions 40. The buttons 64 each have partial spherical surface 66 which is in contact with the respective trunnion spherical surface 56. A planar surface 68 is located on the other side of the button 64 abutting the needle cage assembly 70. The needle cage assembly 70 has a plurality of needle rollers 72 which are in contact with both planar surface 68 and longitudinal guideway portion 40. The cage assembly 70 also includes a cage body 74, which journals the needle rollers 72, a pair of stops 76 on each end of the body 74 and a pair of recesses 78 in the stops 76.

The distance between the stops 76 on the cage assembly 70 is substantially greater than the width of the planar surface 68 on the button 64. This provides a substantial distance between the button 64 and stops 76 which enable a substantial amount of rolling which, in turn, enables a substantial amount of rolling longitudinal travel of the button 64 on the needle bearings 72.

A positioning spring 80 retains the needle cage assembly 70 and buttons 64 onto the trunnions 54. The spring 80 includes a body portion 82, a plurality of arms 84 and a pair of spring fingers 86. A pair of arms 84 extend from each end of the body 82. Each of the four arms include a shoulder portion 88, an upper arm portion 90 and a forearm portion 92. Shoulder 88 extends in a plane substantially parallel to the body 82. The shoulder 88 curves downward into the integral upper arm portion 90 which is substantially perpendicular thereto. The forearm portion 92 extends from the upper arm 90 in substantially the same plane at about a 90 degree angle, as seen in FIG. 3. The forearm 92 includes a hand 94 with fingers 96 retaining the needle cage assembly 70 between opposing hands 94. The fingers 96 are positioned into the recesses 78 of stops 76. Thus, opposing fingers 96 fit in the recesses at each end of the cage assembly 70, as seen in FIG. 3.

The spring fingers 86 extend from the body 82 between each pair of arms 84. The spring fingers 86 are arcuate having an upturned free extending end 98. The free extending ends 98 of the fingers 86 are angled inward towards one another such that fingers 86 spring apart when the trunnion 54 is positioned between them to retain the spring 80 onto the trunnion 54 as illustrated in FIG. 3. The spring fingers 86 position the buttons 64 on the trunnion spherical surfaces 56 in a predetermined position between the stop ends 76 of the cage assembly 70. During longitudinal movement of the buttons 64 with respect to the plurality of needle bearings 72, the spring fingers 86 deflect to produce a force which tends to reposition the buttons 64 to their predetermined position.

Upon operation of the joint 10 under torque, the button 64 moves longitudinally, which, in turn rolls the needle rollers 72 along the longitudinal guideway portion 40 providing travel of the trunnion 54 relative to the longitudinal guideway portions 40. This travel is a result of both angular and telescoping movement of the joint. After a predetermined amount of travel, the button 64 contacts one of the stops 76 formed in the cage body 74. The amount of rolling travel is determined by the distance between the stops 76 and the diameter of the button 64. Any further travel of the trunnion 54 relative to the longitudinal guideway portion 40 will be achieved by the sliding of the needle rollers 72.

During elongation movement or angular changes under torque on the joint, the cage assembly 70, is displaced away from its predetermined position with respect to the button 64 or trunnion 54. This displacement creates a respositioning force in the spring fingers 86 which returns the cage assembly to its predetermined position upon the removal of the torque. By repositioning the cage assembly 70 relative to the trunnion 54 and button 64, the joint 10 will again function as a rolling telescopic joint rather than a sliding telescopic joint.

What is claimed is:

1. A homogenous positioning spring for securing and positioning a pair of bearing cages in a triplan universal joint comprising:
   a body having a first and second end;
   first arm means for retaining a first bearing cage in said triplan universal joint, said first arm means extending from said first end of said body;
   second arm means for retaining a second bearing cage in said triplan universal joint, said second arm means extending from said second end of said body;
   resilient means for securing said positioning spring to a trunnion member of said universal joint and for positioning said pair of bearing cages with respect to said trunnion member, said resilient securing means interposed between said first and second arm means and extending from said body.

2. The positioning spring according to claim 1 wherein said resilient means includes a pair of spring fingers extending from opposite sides of said body between said first and second arm means, said spring fingers each having free ends, said free ends being spaced from one another such that they frictionally retain said spring on the trunnion.

3. The positioning spring according to claim 2 wherein said first and second spring fingers are arcuately shaped.

4. The positioning spring according to claim 2 wherein said free ends of said first and second spring fingers are partially spherical.

5. A telescopic triplan universal joint comprising:
   an outer joint member having at least three longitudinal disposed chambers, each chamber having a pair of oppositely disposed longitudinal sidewalls, each sidewall having a longitudinal surface;
   an inner joint member disposed within said outer joint member said inner joint member having at least three extending trunnions, each trunnion extending into a respective chamber of said at least three chambers between said oppositely disposed longitudinal sidewalls, each of said trunnions having at least a first partial spherical surface facing each of said longitudinal guide surfaces provided in said respective chamber into which it extends;
   a plurality of roller bearings, each roller bearing having a first bearing surface rollingly engaged with a respective one of said longitudinal guide surfaces, and having an opposite bearing surface;
   a plurality of buttons, each button having a second partial spherical surface engaged with said first partial spherical surface of each of said radially extending trunnions and having a planar bearing surface engaged with said respective opposite bearing surface of said plurality of roller bearings;
   a plurality of bearing cages disposed between each of said buttons and each of said longitudinal guide surfaces, each of said bearing cages having a first end on one side of said button and an opposite end on the other side of said button, said bearing cages maintaining said plurality of roller bearings in position;
   a plurality of homogenous positioning springs, each homogenous positioning spring coupled with a first end and an opposite end of at least one pair of said plurality of bearing cages, said positioning springs having resilient means for securing and positioning each of said pairs of bearing cages in a predetermined position such that during longitudinal movement of said bearing cage with respect to said button said resilient means deflects producing a force which tends to reposition said bearing cage to said predetermined position.

6. The telescopic triplan universal joint according to claim 5 wherein each of said homogenous positioning springs comprises:
a body having a first and second end;
first arm means for retaining a first bearing cage in said triplan universal joint, said first arm means extending from said first end of said body;
second arm means for retaining a second bearing cage in said triplan universal joint, said second arm means extending from said second end of said body;
resilient means for securing said positioning spring to a trunnion member of said universal joint and for positioning said first and second bearing cages with respect to said trunnion member, said resilient means interposed between said first and second arm means and extending from said body.

7. The telescopic triplan universal joint according to claim 6 wherein said resilient means includes a pair of spring fingers extending from opposite sides of said body between said first and second arm means, said spring fingers each having free ends, said free ends being spaced from one another such that they frictionally retain said spring on said trunnion.

8. The telescopic triplan universal joint according to claim 7 wherein said first and second spring fingers are arcuately shaped.

9. The telescopic triplan universal joint according to claim 7 wherein said free ends of said first and second spring fingers are partially spherical.

* * * * *